(12) United States Patent
Laurens

(10) Patent No.: US 11,697,513 B2
(45) Date of Patent: Jul. 11, 2023

(54) METHOD FOR ORBIT CONTROL AND DESATURATION OF A SATELLITE BY MEANS OF A SINGLE ARTICULATED ARM CARRYING A PROPULSION UNIT

(71) Applicant: AIRBUS DEFENCE AND SPACE SAS, Toulouse (FR)

(72) Inventor: Philippe Laurens, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 17/924,094

(22) PCT Filed: May 10, 2021

(86) PCT No.: PCT/FR2021/050796
§ 371 (c)(1),
(2) Date: Nov. 8, 2022

(87) PCT Pub. No.: WO2021/229168
PCT Pub. Date: Nov. 18, 2021

(65) Prior Publication Data
US 2023/0122828 A1 Apr. 20, 2023

(30) Foreign Application Priority Data
May 12, 2020 (FR) ...................................... 2004654

(51) Int. Cl.
*B64G 1/24* (2006.01)
*B64G 1/40* (2006.01)

(52) U.S. Cl.
CPC ............... *B64G 1/242* (2013.01); *B64G 1/40* (2013.01)

(58) Field of Classification Search
CPC .......... B64G 1/242; B64G 1/24; B64G 1/244; B64G 1/26; B64G 1/40; B64G 1/28
See application file for complete search history.

(56) References Cited

U.S. PATENT DOCUMENTS 4,071,211 A * 1/1978 Muhlfelder ............ B64G 1/365
701/13
5,259,577 A * 11/1993 Achkar ................... B64G 1/361
244/164

(Continued)

FOREIGN PATENT DOCUMENTS

EP 0 818 721 1/1998
WO 2015/193499 12/2015

OTHER PUBLICATIONS

International Search Report dated Aug. 20, 2021, for PCT/FR2021/050796, 6 pp.

(Continued)

*Primary Examiner* — Assres H Woldemaryam
(74) *Attorney, Agent, or Firm* — Nixon & Vanderhye P.C.

(57) ABSTRACT

A method (50) for orbit control of a satellite (10) in Earth orbit and for desaturation of an angular momentum storage device of the satellite, the satellite (10) including an articulated arm (21) suitable for moving a propulsion unit (31) within a motion volume included in a half-space delimited by an orbital plane when the satellite is in a mission attitude, the method (50) including a single-arm control mode using only the propulsion unit (31) carried by the articulated arm (21), the single-arm control mode using a maneuvering plan including only thrust maneuvers to be executed when the satellite (10) is located within an angular range of at most 180° centered on a target node in the orbit of the satellite (10), including two thrust maneuvers to be performed respectively upstream and downstream of the target node.

15 Claims, 4 Drawing Sheets

(56) References Cited

U.S. PATENT DOCUMENTS

| | | | | |
|---|---|---|---|---|
| 6,015,116 | A | 1/2000 | Anzel et al. | |
| 6,032,904 | A * | 3/2000 | Hosick | B64G 1/405 |
| | | | | 244/169 |
| 6,296,207 | B1 * | 10/2001 | Tilley | B64G 1/242 |
| | | | | 244/165 |
| 10,232,959 | B2 * | 3/2019 | Moro | F02K 9/84 |
| 10,625,882 | B2 * | 4/2020 | Reitman | B64G 1/26 |
| 2013/0292516 | A1 * | 11/2013 | Celerier | B64G 1/26 |
| | | | | 244/158.6 |
| 2013/0313369 | A1 * | 11/2013 | Celerier | B64G 1/26 |
| | | | | 244/158.6 |
| 2014/0361124 | A1 * | 12/2014 | Celerier | B64G 1/242 |
| | | | | 244/158.6 |
| 2015/0001345 | A1 * | 1/2015 | Polle | B64G 1/28 |
| | | | | 244/158.6 |
| 2018/0029727 | A1 * | 2/2018 | Doubrere | B64G 1/242 |

OTHER PUBLICATIONS

Written Opinion of the ISA dated Aug. 20, 2021, for PCT/FR2021/050796, 11 pp.
Transmittal of the International Preliminary Report on Patentability dated Oct. 20, 2021, for PCT/FR2021/050796, 20 pp.

\* cited by examiner

# METHOD FOR ORBIT CONTROL AND DESATURATION OF A SATELLITE BY MEANS OF A SINGLE ARTICULATED ARM CARRYING A PROPULSION UNIT

RELATED APPLICATION

This application is the U.S. national phase of International Application PCT/FR2021/050796, filed May 10, 2021, which designated the U.S. and claims priority to French patent application FR 2004654, filed May 12, 2020, the entire contents of each of which are hereby incorporated by reference.

Technical field

This invention belongs to the field of satellite orbit and attitude control. A particularly advantageous application of the invention, although in no way limiting, is the case of telecommunications satellites in geostationary orbit (or GEO) that are equipped with electric propulsion means.

Prior art

As is known, a satellite in Earth orbit is subject to numerous perturbations. These perturbations tend to displace the satellite from a set position in its orbit, and to modify the attitude of said satellite with respect to a set attitude.

In order to maintain the satellite substantially in the set position and in the set attitude, it is necessary to perform orbit control and attitude control for said satellite.

Orbit control consists of limiting variations in the orbital parameters generally expressed in terms of inclination, longitude, and eccentricity of the satellite's orbit. In the case of a satellite in GEO orbit, such as a telecommunications satellite, orbit control amounts to controlling the position of the satellite relative to the Earth, and is also known as station keeping (or "S/K").

Orbit control of a satellite in GEO orbit is generally achieved by means of several thrust maneuvers during which the satellite's thrusters are activated. Satellite orbit control is performed by adjusting the thrust forces formed by said thrusters during the various thrust maneuvers, but also by adjusting the activation durations of said thrusters.

Generally, the most important requirements for orbit control concern controlling the inclination of the satellite's orbit, which is achieved by performing thrust maneuvers, called North/South (N/S) maneuvers, on both sides of the Earth, respectively in the vicinity of the ascending node and of the descending node of the satellite's orbit. In the vicinity of the ascending node, the thrust maneuver forms a thrust force which tends to bring the satellite back towards the southern hemisphere. In the vicinity of the descending node, the thrust maneuver forms a thrust force which tends to bring the satellite back towards the northern hemisphere.

Attitude control consists of controlling the orientation of the satellite, in particular relative to the Earth. When the satellite is stationed in orbit, perturbations apply torques which tend to cause said satellite to rotate around its center of mass and therefore to modify the attitude of said satellite relative to the set attitude (mission attitude). Note that orbit control thrust maneuvers can also apply perturbation torques when the thrust forces are not perfectly aligned with the satellite's center of mass.

In order to maintain the satellite in the set attitude, the satellite is generally equipped with an angular momentum storage device. The angular momentum storage device comprises, for example, at least three reaction wheels with linearly independent axes of rotation. By controlling the speed of rotation of said reaction wheels, it is possible to create torques to oppose the perturbation torques.

Due to the cumulative effect of the perturbation torques, the speeds of rotation of said reaction wheels and therefore the stored angular momentum tend to increase progressively. It is therefore necessary to regularly desaturate the angular momentum storage device in order to limit the speed deviation of said reaction wheels. "Desaturate" is understood to mean applying external torques to the satellite which, when they are taken up by the angular momentum storage device, allow reducing the amount of angular momentum stored. Such desaturation of the angular momentum storage device is known as "angular momentum unloading".

Desaturation of the angular momentum storage device generally makes use of the satellite's thrusters, which are activated during attitude control thrust maneuvers.

A solution is known from document EP 3157815 A1 which allows reducing both the number of thrusters on board the satellite and the number of thrust maneuvers, making it possible to carry out both orbit control (inclination, longitude, eccentricity) and three-axis desaturation of the satellite's angular momentum storage device.

In document EP 3157815 A1, the satellite is equipped with two articulated arms each having at least three degrees of freedom, carrying respective thrusters and being arranged one on either side of a body of the satellite, one articulated arm being arranged on the North side of the satellite while the other articulated arm is arranged on the South side of the satellite. In document EP 3157815 A1, a maneuvering plan is used, comprising at least two thrust maneuvers respectively executed in the vicinity of the ascending node and of the descending node of the satellite's orbit. The thrust forces of these two thrust maneuvers are determined so as to control the inclination and longitude of the satellite's orbit, and to form desaturation torques for the storage device. In addition, the thrust forces are deliberately non-parallel within the inertial frame of reference, in order to allow performing a three-axis desaturation of the storage device in these two thrust maneuvers. These two articulated arms, and the thrusters they carry, also allow controlling the eccentricity of the satellite's orbit, including during said two thrust maneuvers.

The solution proposed by document EP 3157815 A1 thus makes it possible, by means of two articulated arms carrying thrusters, to control all the orbital parameters and to perform a three-axis desaturation of the storage device, while limiting the number of thrust maneuvers.

The issue that arises is the robustness of such a satellite in the event of failure of one of the two articulated arms. Indeed, failure of an articulated arm cannot be completely excluded, especially during the second half of the duration of the satellite mission. It is therefore tempting to equip the satellite with redundant thrusters and/or articulated arms in order to work around such a failure, which increases the complexity and manufacturing cost of the satellite.

Disclosure of the invention

The invention aims to remedy some or all of the limitations of the prior art solutions, in particular those set forth above, by proposing a solution which makes it possible to continue to control the orbit of a satellite and to desaturate an angular momentum storage device of said satellite even by means of a single articulated arm.

To this end, and according to a first aspect, a method is proposed for orbit control of a satellite in Earth orbit and for desaturation of an angular momentum storage device of said satellite, said satellite comprising an articulated arm having at least three degrees of freedom, said articulated arm comprising a first end connected to a body of the satellite and a second end carrying a propulsion unit, said articulated arm being suitable for moving said second end within a motion volume included in a half-space delimited by an orbital plane of the satellite when said satellite is in a mission attitude. The control method comprises a control mode referred to as "single-arm" because it uses only the propulsion unit carried by the articulated arm to control the satellite's orbit and to desaturate the storage device, said single-arm control mode using a maneuvering plan comprising only thrust maneuvers to be executed when the satellite is located within an angular range of at most 180° centered on a predetermined node in the satellite's orbit, referred to as the target node. Preferably, said maneuvering plan comprises at least one thrust maneuver referred to as "upstream", to be executed upstream of said target node, and one thrust maneuver referred to as "downstream", to be executed downstream of said target node.

By means of its at least three degrees of freedom, the articulated arm makes it possible to modify, within a satellite frame of reference, both the thrust direction and the point of application of a thrust force formed by the propulsion unit.

The thrust forces achievable by the propulsion unit carried by the articulated arm are limited in particular by the motion volume of the articulated arm. In particular, when the satellite is in its mission attitude, such an articulated arm can only apply thrust forces within a half-space delimited by the orbital plane.

For example, an articulated arm positioned more towards the North side of a satellite body is in principle designed to form thrust forces directed partly towards the North, in order to push the satellite towards the South. The propulsion unit of such a North-positioned articulated arm is typically activated in the vicinity of the ascending node of the satellite's orbit. Conversely, an articulated arm positioned at the South is in principle designed to form thrust forces directed partly towards the South, in order to push the satellite towards the North. The propulsion unit of such a South-positioned articulated arm is typically activated in the vicinity of the descending node of the satellite's orbit.

The inventors have found that it is possible to control the satellite's orbit and to desaturate the satellite's angular momentum storage device by means of a single articulated arm carrying a propulsion unit, using a single-arm control mode.

Unlike the prior art, which distributes the thrust maneuvers substantially symmetrically with respect to the Earth, in the vicinity of the ascending and descending nodes, the thrust maneuvers of the single-arm control mode are all executed on only one side of the Earth, on the side of a predetermined node of the orbit called the target node.

In practice, the target node is determined by the motion volume of the articulated arm. Indeed, if the motion volume is located in the North half-space (articulated arm positioned towards the North side), then the target node is the ascending node of the orbit. Conversely, if the motion volume is located in the South half-space (articulated arm positioned towards the South side), then the target node is the descending node of the orbit.

By thus performing all the thrust maneuvers within an angular range of at most 180° centered on the target node (ascending node or descending node, depending on the position of the motion volume relative to the orbital plane), it is possible to perform all orbit control and storage device desaturation operations with a single articulated arm. To facilitate three-axis desaturation of the storage device in particular, the maneuvering plan comprises at least two thrust maneuvers executed at different angular positions of the satellite in its orbit. Advantageously, the maneuvering plan comprises a thrust maneuver to be executed upstream of said target node, referred to as an "upstream thrust maneuver", and a thrust maneuver to be executed downstream of said target node, referred to as a "downstream thrust maneuver". Such arrangements also make it possible to have more effective control of the various orbital parameters of the satellite's orbit, in particular from the point of view of fuel consumption.

Thus, such a single-arm control mode can be implemented upon detecting a failure of an articulated arm of a satellite initially comprising several articulated arms. Such a single-arm control mode may also be implemented as a default control mode in the case of a satellite initially equipped with a single articulated arm.

In some particular modes of implementation, the control method may further comprise one or more of the following features, in isolation or in all technically possible combinations.

In some particular modes of implementation, the upstream thrust maneuver is executed at least in part when the satellite is located within an angular range of between 40° and 60° upstream of the target node, and the downstream thrust maneuver is executed at least in part when the satellite is located within an angular range of between 40° and 60° downstream of the target node.

When a single articulated arm is used to control the orbit of the satellite and to desaturate the storage device, several parameters may be taken into account.

On the one hand, the movement of the articulated arm must be limited as much as possible in order to reduce stresses on the joints of the articulated arm and increase its lifespan, which would mean moving the successive thrust maneuvers further apart along the satellite's orbit. Indeed, non-parallel thrust forces within the inertial frame of reference, conducive to three-axis desaturation, can then be formed without having to move the articulated arm significantly. In addition, more time is then available for performing the necessary movements of the articulated arm.

On the other hand, the fuel consumption of the propulsion unit must be reduced in order to increase the satellite's lifespan, which instead would mean bringing the thrust maneuvers closer to the target node. Indeed, the closer the thrust maneuvers are executed to the target node, the more effective they are. However, the movements of the articulated arm would then be greater and would need to be carried out more quickly, at least if the downstream thrust maneuver is executed immediately after the upstream thrust maneuver, during the same orbital half-period.

Executing at least part of the upstream thrust maneuver when the satellite is located within an angular range of between 40° and 60° upstream of the target node, and executing at least part of the downstream thrust maneuver when the satellite is located within an angular range of between 40° and 60° downstream of the target node, then constitutes a good compromise from the point of view of the amplitude of movements of the articulated arm versus fuel consumption.

In some particular modes of implementation, the upstream thrust maneuver is executed in its entirety when the satellite is located within the angular range of between 40° and 60° upstream of the target node, and the downstream thrust maneuver is executed in its entirety when the satellite is located within the angular range of between 40° and 60° downstream of the target node.

In some particular modes of implementation, each thrust maneuver of the maneuvering plan is executed at least in part when the satellite is located within the angular range of between 40° and 60° upstream of the target node or within the angular range of between 40° and 60° downstream of the target node.

In some particular modes of implementation, the maneuvering plan comprises at least one thrust maneuver per orbital period.

In some particular modes of implementation, the upstream thrust maneuver and the downstream thrust maneuver are executed during a same orbital half-period.

In some particular modes of implementation, the upstream thrust maneuver and the downstream thrust maneuver have propulsion unit thrust forces in respective thrust directions that are non-parallel in an inertial frame of reference, said thrust forces being determined so as to form torques in respective non-parallel planes in the inertial frame of reference and to perform a three-axis desaturation of said angular momentum storage device.

In some particular modes of implementation, the upstream thrust maneuver and the downstream thrust maneuver have propulsion unit thrust forces which are determined so as to control at least the inclination of the satellite's orbit.

In some particular modes of implementation, the upstream thrust maneuver and the downstream thrust maneuver have propulsion unit thrust forces which are determined so as to further control at least one orbital parameter among the longitude and eccentricity of the satellite's orbit.

In some particular modes of implementation, the articulated arm comprises at least three joints each having at least one degree of freedom in rotation about an axis of rotation, a first joint and a second joint being separated by a first connecting member and having respective non-parallel axes of rotation, the second joint and a third joint being separated by a second connecting member and having respective non-parallel axes of rotation, the articulated arm being controlled to carry out a thrust maneuver by controlling the joints of the articulated arm.

In some particular modes of implementation, the satellite comprising two articulated arms each having at least three degrees of freedom and each carrying a propulsion unit, said two articulated arms being suitable for moving the propulsion units within respective motion volumes included in respective half-spaces which are opposite each other in relation to the satellite's orbital plane when said satellite is in the mission attitude, said method further comprises a control mode referred to as "two-arm" because it uses the two articulated arms:
- the two-arm control mode being used as long as a control mode change criterion is not met,
- the single-arm control mode being used when the control mode change criterion is met.

In some particular modes of implementation, the control mode change criterion is met when failure of an articulated arm is detected. "Failure of an articulated arm" is understood to mean a failure of the articulated arm itself and/or a failure of the propulsion unit carried by this articulated arm.

According to a second aspect, a satellite intended to be placed in Earth orbit is proposed, comprising an articulated arm having at least three degrees of freedom, said articulated arm comprising a first end connected to a body of the satellite and a second end carrying a propulsion unit, said articulated arm being suitable for moving said second end within a motion volume included in a half-space delimited by an orbital plane of the satellite when said satellite is in a mission attitude. In addition, the satellite comprises means configured for implementing a method for orbit control and desaturation according to any of the embodiments of the invention.

According to a third aspect, a satellite system is proposed comprising a ground station and a satellite in Earth orbit, said satellite comprising an articulated arm having at least three degrees of freedom, said articulated arm comprising a first end connected to a body of the satellite and a second end carrying a propulsion unit, said articulated arm being suitable for moving said second end within a motion volume included in a half-space delimited by an orbital plane of the satellite when said satellite is in a mission attitude. In addition, the satellite system comprises means configured for implementing a method for orbit control and desaturation according to any of the embodiments of the invention.

In some particular embodiments, the satellite system may further comprise one or more of the following features, separately or in all technically possible combinations.

In some particular embodiments, the articulated arm comprises at least three joints each having at least one degree of freedom in rotation about an axis of rotation, a first joint and a second joint being separated by a first connecting member and having respective non-parallel axes of rotation, the second joint and a third joint being separated by a second connecting member and having respective non-parallel axes of rotation.

In some particular embodiments, the propulsion unit comprises only electric thrusters.

In some particular embodiments, the satellite comprises only electric thrusters.

In some particular embodiments, the satellite is in geostationary orbit.

Presentation of figures

The invention will be better understood upon reading the following description, given by way of non-limiting example, and made with reference to the figures which show:

In these figures, identical references in different figures designate identical or similar elements. For clarity, the items are not shown to scale unless otherwise noted.

Description of embodiments

Figure 1:
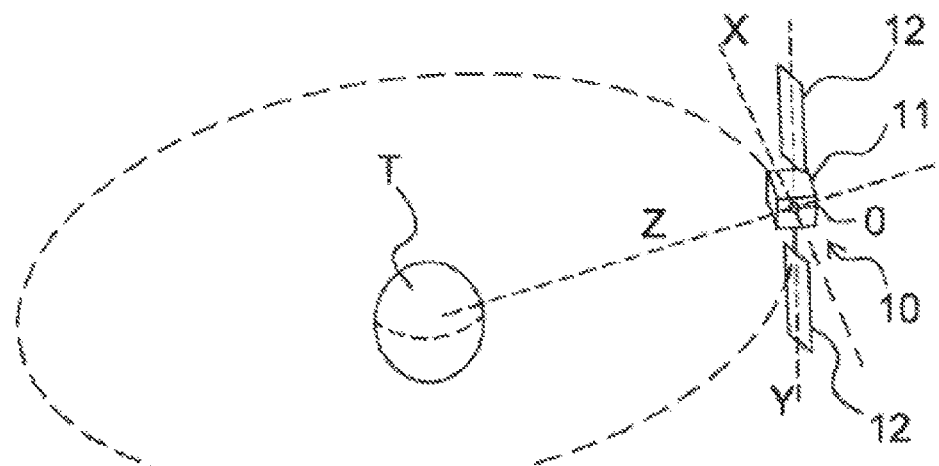
FIG. 1 is a schematic representation of a satellite in orbit around the Earth.

FIG. 1 schematically represents a satellite 10 in orbit around the Earth T.

In the remainder of this description, reference is made in a non-limiting manner to the case of a satellite 10 in GEO orbit. However, nothing excludes considering other types of Earth orbits in other examples, for example geosynchronous orbits, medium Earth orbits (MEO), low Earth orbits (LEO), etc.

For the purposes of the description, the satellite 10 is associated with a satellite frame of reference centered on a center of mass O of the satellite 10 and having three axes X, Y, Z. More particularly, axis X is parallel to a velocity vector of the satellite 10 within the inertial frame of reference, axis Z is directed towards the center of the Earth T, and axis Y is orthogonal to axes X and Z. Each of the axes X, Y and Z of the satellite frame of reference is associated with respective unit vectors ux, uy, and uz. Unit vector ux corresponds to the velocity vector normalized by the normal of said velocity vector, unit vector uz is oriented from the center of mass O of the satellite 10 towards the center of the Earth T, and unit vector uy is oriented such that the set (ux, uy, uz) constitutes a direct orthonormal basis of the satellite frame of reference.

As illustrated by FIG. 1, the satellite 10 comprises for example a body 11 and two solar generators 12 one on either side of the body 11. The two solar generators 12 are for example mounted to be rotatable relative to the body 11 of the satellite 10, about a same axis of rotation.

In the remainder of the description, in a non-limiting manner the case is considered where the body 11 of the satellite 10 is substantially in the shape of a rectangular parallelepiped. The body 11 thus comprises six faces where all opposite faces are parallel, and the two solar generators 12 are arranged respectively on two opposite faces of said body 11, the axis of rotation of said two solar generators 12 being substantially orthogonal to said two opposite faces of the body 11 of the satellite 10.

In the remainder of the description, the case is considered where the attitude of the satellite 10 is controlled, for the purposes of the mission of said satellite 10, so as to be placed in a set attitude called the "mission attitude". For example, the mission attitude is such that:
- a face of the body 11 of the satellite 10, designated "face +Z", carrying for example a payload instrument of said satellite 10, is directed towards the Earth and is substantially orthogonal to axis Z; the face opposite to face +Z, then arranged on the side opposite the Earth, being designated "face −Z";
- the two opposite faces of the body 11 of the satellite 10 on which the two solar generators 12 are arranged, respectively designated "face +Y" (relative to the center of mass O: on the side pointed to by unit vector uy) and "face −Y", are substantially orthogonal to axis Y;
- the last two opposite faces of the body 11 of the satellite 10, respectively designated "face +X" (relative to the center of mass O: on the side pointed to by unit vector ux) and "face −X", are substantially orthogonal to axis X.

In addition, the satellite 10 being in GEO orbit in the example considered, the orbital plane of the satellite 10, which corresponds to the equatorial plane, is coincident with plane (X, Z) when said satellite 10 is in its mission attitude. The −Y face is on the northern hemisphere side and is also referred to as the "North face", and the +Y face is on the southern hemisphere side and is also referred to as the "South face".

The satellite 10 also comprises a set of actuators suitable for controlling the orbit and attitude of the satellite 10, as well as a control device (not shown in the figures) for the actuators, also on board the satellite 10.

For the purposes of attitude control, the satellite 10 comprises in particular an angular momentum storage device (not shown in the figures) suitable for storing an angular momentum of any axis, meaning having a capacity for storing angular momentum along three linearly independent axes. The angular momentum storage device comprises a set of inertial actuators such as reaction wheels and/or control moment gyroscopes. For example, the angular momentum storage device comprises at least three reaction wheels with respective linearly independent axes of rotation.

As indicated above, orbit control consists of controlling at least one orbital parameter among inclination, longitude, and eccentricity of the orbit of the satellite 10. In the case of a satellite 10 in GEO orbit, it is known that the requirements in terms of orbit control, for example expressed in terms of the speed variation required per year (m/s/year), are mainly imposed by controlling the inclination of the orbit of the satellite 10 (North/South or N/S control). The order of magnitude of the speed variation required per year for N/S control, along axis Y, is thus 50 m/s/year, while it is 2-4 m/s/year for orbit longitude control (East/West or E/W control), along axis X.

In the invention, the satellite 10 comprises, for the purposes of orbit control and desaturation of the angular momentum storage device, at least one articulated arm having at least three degrees of freedom, carrying a propulsion unit and suitable for moving said propulsion unit within the satellite's frame of reference.

The propulsion unit comprises at least one thruster. In preferred embodiments, the propulsion unit comprises at least two thrusters, for example in order to overcome a failure of one of the thrusters or to distribute their use so that they alternate over the duration of the mission.

Figure 2:
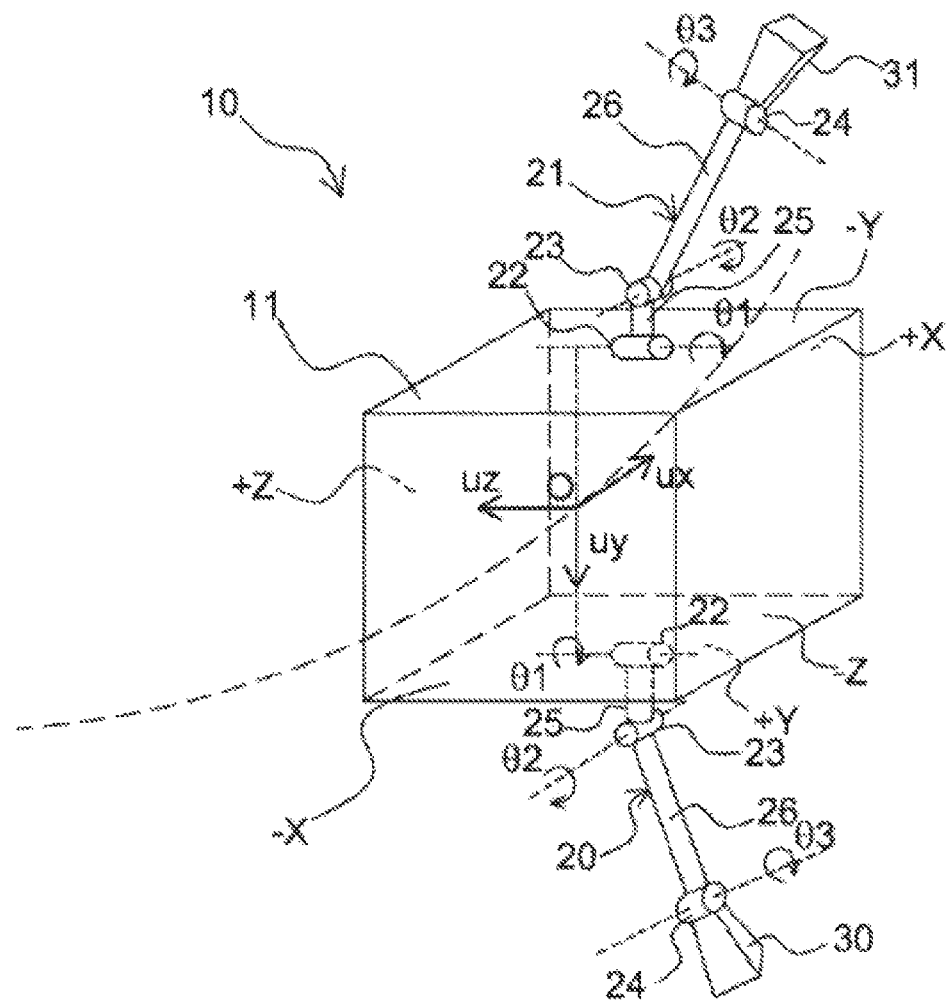
FIG. 2 is a schematic representation of an embodiment of a satellite.

FIG. 2 schematically represents one particular embodiment of a satellite 10 comprising two articulated arms 20, 21, Each articulated arm 20, 21 comprises a first end connected to the body 11 of the satellite 10, and a second end carrying a propulsion unit 30, 31.

In the remainder of the description, the case in which the propulsion units 30, 31 comprise only electric thrusters (electrothermal, electrostatic, plasma, etc.) is considered in a non-limiting manner. However, nothing excludes one or both propulsion units 30, 31 comprising chemical propellants (cold gas, liquid fuel, etc.) in other examples.

In general, each of the two articulated arms 20, 21 has at least three degrees of freedom, and said two articulated arms 20, 21 are suitable for moving the propulsion units 30, 31 within different respective motion volumes included in respective half-spaces that are opposite each other relative to the orbital plane of the satellite 10. As indicated above, the orbital plane, which corresponds to the equatorial plane, corresponds to plane (X, Z) when the satellite 10 is in the mission attitude. The respective motion volumes of the articulated arms 20 and 21 are included:
- in the half-space delimited by plane (X, Z) on the South face (+Y) side, for articulated arm 20,
- in the half-space delimited by plane (X, Z) on the North face (−Y) side, for articulated arm 21.

In general, throughout this application, a thrust force is defined by a thrust vector and a point of application of said thrust force relative to the center of mass O of the satellite 10. The thrust vector itself is defined by a thrust normal and by a unit normal thrust direction, which corresponds to the thrust vector normalized by said thrust normal. It is therefore understood that the articulated arms 20, 21 allow modifying, within the satellite frame of reference, both the thrust directions and the points of application of the thrust forces formed by the propulsion units 30, 31.

In the example illustrated by FIG. 2, the first end of articulated arm 20 is located on the South face, while the first end of articulated arm 21 is located on the North face, of the body 11 of the satellite 10. In this example, the first ends of the articulated arms 20, 21 are connected to the body 11 of the satellite 10 at respective points which are offset towards the −Z face relative to the orthogonal projections of the theoretical center of mass on the South and North faces. Such a configuration of the articulated arms 20, 21, connected to the body 11 of the satellite 10 at points offset towards the −Z face relative to the orthogonal projections of the theoretical center of mass, makes it easier to control the eccentricity of the orbit of the satellite 10. Indeed, the thrust force of propulsion unit 30 (respectively propulsion unit 31), when it is applied at a point of application such that no torque is formed, then comprises a non-zero component along axis Z.

However, other positions are possible for the first ends of the articulated arms 20, 21, provided that the respective motion volumes of said articulated arms 20, 21 are within respective half-spaces that are opposite each other relative to plane (X, Z). According to another non-limiting example, the first ends of the articulated arms 20, 21 may both be positioned on the −Z face of the satellite, near the South face for articulated arm 20 and near the North face for articulated arm 21.

In the example illustrated by FIG. 2, each articulated arm 20, 21 comprises three joints 22, 23, 24, each joint comprising at least one degree of freedom in rotation about an axis of rotation. Joints 22 and 23 are interconnected and separated by connecting member 25, while joints 23 and 24 are interconnected and separated by connecting member 26. In addition, for each articulated arm 20, 21, the respective axes of rotation of adjacent joints 22, 23, 24 are not parallel for each of the two pairs of adjacent joints. Thus the axes of rotation of joints 22 and 23 are not parallel to each other, and the axes of rotation of joints 23 and 24 are not parallel to each other.

To control the thrust direction and the point of application of the thrust force, the control device controls the angles of rotation of the joints 22, 23, 24, respectively designated θ1, θ2, and θ3.

Such articulated arms 20, 21 having three degrees of freedom allow controlling all orbital parameters of the orbit of the satellite 10 and desaturating the angular momentum storage device along three axes, without it being necessary to equip the satellite 10 with thrusters other than those of the propulsion units 30, 31 in order to perform the orbit control and desaturation. Such articulated arms 20, 21 may also be used for positioning the satellite 10 in its mission orbit, by orienting the propulsion units 30, 31 so as to form thrust forces having significant components along axis Z.

In the case of a satellite 10 as illustrated by FIG. 2, i.e. comprising two articulated arms 20, 21, the control device may for example control the orbit of the satellite 10 and the desaturation of the angular momentum storage device by implementing a control mode referred to as "two-arm control mode" because it uses the two articulated arms 20, 21 (and the two propulsion units 30, 31).

Two-arm control mode, which is outside the scope of this invention, is for example in accordance with what is proposed in document EP 3157815 A1, and for example uses articulated arm 20 (on the South face side) to carry out a thrust maneuver in the vicinity of the descending node of the orbit of the satellite 10, and articulated arm 21 (on the North face side) to carry out a thrust maneuver in the vicinity of the ascending node of said orbit of said satellite 10.

The invention relates more particularly to a control mode referred to as "single arm control mode", because the control device uses a single articulated arm to control the orbit of the satellite 10 and to desaturate the angular momentum storage device of said satellite 10.

In the case of the satellite 10 illustrated by FIG. 2, i.e. comprising two articulated arms 20, 21, it is possible for example to use either two-arm control mode or single-arm control mode. For example, two-arm control mode may be used by default, while single-arm control mode may be used when a predetermined criterion for changing the control mode is met. For example, the criterion for changing the control mode can be considered to be met when a permanent or temporary failure is detected in an articulated arm 20, 21. When necessary, single-arm control mode is implemented using the other articulated arm 21, 20 which is still operational.

Note, however, that in other examples it is also possible for single-arm control mode to be the default. For example, in the case of a satellite 10 comprising a single articulated arm, two-arm control mode is obviously not available, and only single-arm control mode is implemented for orbit control of the satellite 10 and desaturation of the angular momentum storage device of the satellite 10.

In single-arm control mode, orbit control of the satellite 10 and desaturation of the angular momentum storage device are carried out, at the control device, by controlling only one of the articulated arms 20, 21 and the propulsion unit 30, 31 carried by that articulated arm, according to a maneuvering plan comprising thrust maneuvers during which the propulsion unit is activated to form a thrust force.

In single-arm control mode, the maneuvering plan includes only thrust maneuvers which are executed when the satellite 10 is located within an angular range of at most 180° centered on a predetermined node of the orbit of the satellite 10, called the "target node".

In practice, the target node is determined by the motion volume of the articulated arm 20, 21 used. For example, if single-arm control mode uses articulated arm 20 (positioned on the South face side), then the target node corresponds to the descending node of the orbit. Indeed, articulated arm 20 can form thrust forces which push the satellite towards the North, which are useful at the descending node, when the satellite 10 transitions from the northern hemisphere to the southern hemisphere. Conversely, if single-arm control mode uses articulated arm 21 (positioned on the North face side), then the target node corresponds to the ascending node of the orbit. Indeed, articulated arm 21 can form thrust forces which push the satellite towards the South, which are useful at the ascending node, when the satellite 10 transitions from the southern hemisphere to the northern hemisphere.

Thus, all the thrust maneuvers in the maneuvering plan for single-arm control mode are executed within an angular range of at most 180° centered on the target node, i.e. an angular range of between at most 90° upstream of the target node and 90° downstream of said target node.

In addition, the maneuvering plan comprises at least one thrust maneuver which is executed upstream of said target node, referred to as an "upstream thrust maneuver", and one thrust maneuver which is executed downstream of said target node, referred to as a "downstream thrust maneuver", in order to have more efficient thrust maneuvers from a fuel consumption point of view. It is thus easier to have thrust maneuvers spaced apart significantly (for example spaced apart by at least 20°), allowing in particular a better three-axis desaturation capacity while maintaining thrust maneuvers relatively close to the target node, where N/S control (which requires the most fuel) is most effective.

The control device thus controls the orbit of the satellite 10 and desaturation of the angular momentum storage device according to the maneuvering plan determined for single-arm control mode.

The control device comprises for example at least one processor and at least one electronic memory in which a computer program product is stored, in the form of a set of program code instructions to be executed in order to control articulated arm 20 or 21 and propulsion unit 30 or 31 which it carries, according to such a maneuvering plan. Alternatively, the control device comprises one or more programmable logic circuits, of types such as FPGA, PLD, etc., and/or dedicated integrated circuits (ASIC) suitable for implementing some or all of said steps for controlling said articulated arm and the propulsion unit it is carrying, according to such a maneuvering plan. In other words, the control device comprises a set of means configured in software (specific computer program product) and/or hardware (FPGA, PLD, ASIC, etc.) to control articulated arm 20 or 21 and the propulsion unit 30 or 31 which it carries, according to the maneuvering plan of single-arm control mode.

The remainder of the description concerns, in a non-limiting manner, the case where it is articulated arm 21 which is controlled by the control device using single-arm control mode, for example due to a failure of articulated arm 20. Therefore, the target node of the maneuvering plan corresponds to the ascending node of the orbit of the satellite 10, and all thrust maneuvers of the maneuvering plan are executed within an angular range of at most 180° centered on the ascending node, extending from at most 90° upstream of said ascending node to 90° downstream of said ascending node. Note that the required condition is only the angular range of the possible positions of the satellite 10 relative to the ascending node (target node): the thrust maneuvers may be executed during the same orbital period and/or during different orbital periods.

The main parameters to be adjusted in the maneuvering plan are for example:
- the start dates of the various thrust maneuvers, i.e. the dates of activation of propulsion unit 31; the start dates must allow carrying out the thrust maneuvers within said angular range of at most 180° centered around the target node, which is the ascending node in the example considered, including an upstream thrust maneuver and a downstream thrust maneuver,
- the durations of the various thrust maneuvers, i.e. the activation durations of propulsion unit 31,
- the thrust directions and the points of application, relative to the center of mass O of the satellite 10, of the respective thrust forces of the various thrust maneuvers.

The remainder of the description concerns, in a non-limiting manner, the case where the thrust direction and the point of application of each thrust force in the maneuvering plan are fixed within the satellite frame of reference, for the entire duration of the corresponding thrust maneuver. In other words, the values of angles $\theta 1$, $\theta 2$, and $\theta 3$ of joints 22, 23, 24 of articulated arm 21 are not modified during a same thrust maneuver. However, in other examples, nothing excludes varying said values of angles $\theta 1$, $\theta 2$, and $\theta 3$, in order to increase the number of degrees of freedom for the orbit control and desaturation.

It is also possible to adjust other parameters such as the thrust normals of the respective thrust forces of said various thrust maneuvers (in the case of propulsion unit 31 for which the thrust normal can be controlled, for example by ON/OFF modulation).

In the remainder of the description, it is considered that the maneuvering plan comprises exactly two thrust maneuvers, exactly one upstream thrust maneuver and one downstream thrust maneuver. F1 denotes the thrust force of propulsion unit 31 during the first of the two thrust maneuvers, which begins on date T1, and F2 denotes the thrust force of propulsion unit 31 during the second of the two thrust maneuvers, which begins on date T2. Thrust forces F1 and F2 are expressed within the satellite frame of reference according to the following expressions:

$$F1 = F1x \cdot ux(T1) + F1y \cdot uy(T1) + F1z \cdot uz(T1)$$

$$F2 = F2x \cdot ux(T2) + F2y \cdot uy(T2) + F2z \cdot uz(T2)$$

expressions in which:
- (F1x, F1y, F1z) are the components of thrust force F1 within the satellite frame of reference at date T1, for which the unit vectors are (ux(T1), uy(T1), uz(T1)),
- (F2x, F2y, F2z) are the components of thrust force F2 within the satellite frame of reference at date T2, for which the unit vectors are (ux(T2), uy(T2), uz(T2)).

If we consider the case where the maneuvering plan aims to control all orbital parameters (inclination, longitude, eccentricity) of the orbit of the satellite 10 and to desaturate the angular momentum storage device of said satellite 10 along three axes, then the system of equations to be solved comprises nine equations, relating to the following parameters:
- $\Delta Vx(T1)$ and $\Delta Vx(T2)$, scalar parameters which correspond to requirements in terms of the required speed variation along axis X (E/W control), during the first thrust maneuver and the second thrust maneuver,
- $\Delta Vy(T1)$ and $\Delta Vy(T2)$, scalar parameters which correspond to requirements in terms of the required speed variation along axis Y (N/S control), during the first thrust maneuver and the second thrust maneuver,
- $\Delta Vz(T1)$ and $\Delta Vz(T2)$, scalar parameters which correspond to requirements in terms of the required speed variation along axis Z (eccentricity control), during the first thrust maneuver and the second thrust maneuver,
- $\Delta H$, a vector of three scalar parameters corresponding to the components of the angular momentum to be removed from the angular momentum storage device at the end of the first thrust maneuver and the second thrust maneuver, expressed within the inertial frame of reference.

By adjusting the durations and dates of the two thrust maneuvers and the values of angles $\theta 1(T1)$, $\theta 2(T1)$, $\theta 3(T1)$, $\theta 1(T2)$, $\theta 2(T2)$, and $\theta 3(T2)$ of joints 22, 23, 24 of articulated arms 20, 21 during said two thrust maneuvers, we then have a sufficient number of degrees of freedom to solve the above system of equations.

Figure 3:
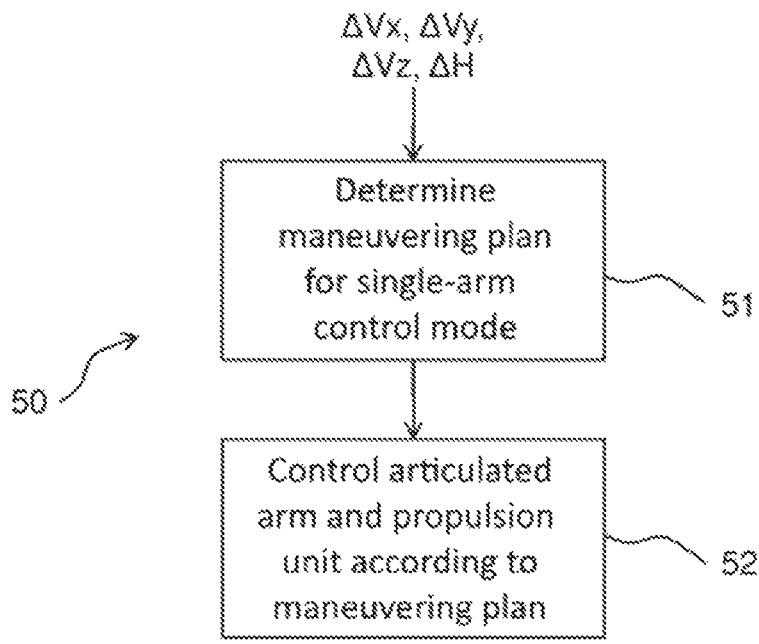
FIG. 3 is a diagram illustrating the main steps of a mode of implementation of a method for orbit control and desaturation.

FIG. 3 schematically represents the main steps of a method 50 for orbit control of the satellite 10 and for desaturation of an angular momentum storage device of said satellite.

As illustrated by FIG. 3, the method 50 for orbit control and desaturation comprises in particular a step 51 of determining a maneuvering plan for single-arm control mode, defined over one or more orbital periods. The maneuvering plan comprises only thrust maneuvers to be executed within an angular range of at most 180° centered on the target node of the orbit, and comprises at least one upstream thrust maneuver and at least one downstream thrust maneuver.

The thrust maneuvers of the maneuvering plan are determined according to predetermined requirements for inclination control ($\Delta Vy$), longitude control ($\Delta Vx$), and eccentricity control ($\Delta Vz$), for the orbit of the satellite 10, and according to a predetermined need for desaturation ($\Delta H$) of the angular momentum storage device of said satellite 10.

In order to be able to desaturate the angular momentum storage device regardless of the direction of the stored angular momentum, the maneuvering plan may comprise two thrust maneuvers in which the respective thrust forces are thrust directions that are not parallel within the inertial frame of reference. Thus, during said two thrust maneuvers, the planes in which it is possible to form a desaturation torque are not parallel such that, in the set of two thrust maneuvers, the vector space in which it is possible to form a desaturation torque is three-dimensional. In practice, the upstream thrust maneuver and the downstream thrust maneuver may have thrust forces of non-parallel thrust directions within the inertial frame of reference. The further apart the upstream and downstream thrust maneuvers are within the angular range of at most 180° centered on the ascending node, the greater the capacity for three-axis desaturation will be.

Once the maneuvering plan for single-arm control mode has been determined, the method 50 for orbit control and desaturation comprises a step 52 of controlling articulated arm 21 and propulsion unit 31 carried by said articulated arm, according to the maneuvering plan.

As indicated above, control step 52 is implemented by the control device on board the satellite 10.

Step 51 of determining the maneuvering plan may be executed at the satellite 10 by the control device on board said satellite 10, or on the ground by a ground station of a satellite system. In the case where the maneuvering plan is determined by a ground station, said maneuvering plan is transmitted to the satellite 10 for implementation by the control device. The maneuvering plan may also, according to other examples, be determined jointly by the satellite 10 and the ground station.

The ground station comprises, for example, at least one processor and at least one electronic memory in which a computer program product is stored, in the form of a set of program code instructions to be executed in order to determine the maneuvering plan. Alternatively, the ground station comprises one or more programmable logic circuits, of types such as FPGA, PLD, etc., and/or dedicated integrated circuits (ASIC) suitable for determining the maneuvering plan. In other words, the ground station comprises a set of means configured in software (specific computer program product) and/or hardware (FPGA, PLD, ASIC, etc.) to implement the various operations which allow determining the maneuvering plan.

Figure 4:
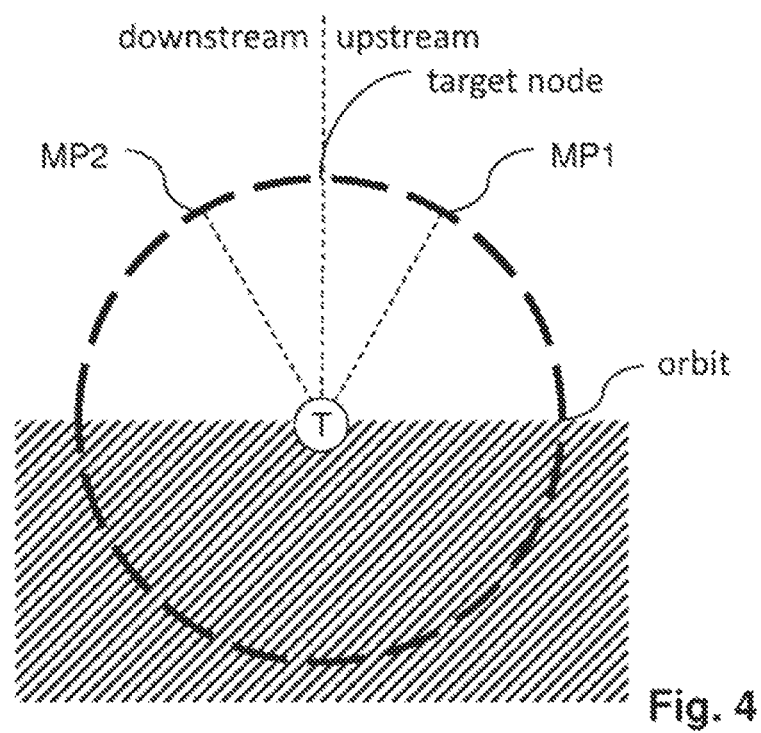
FIG. 4 is a schematic representation of a first example of a maneuvering plan.
Figure 5:
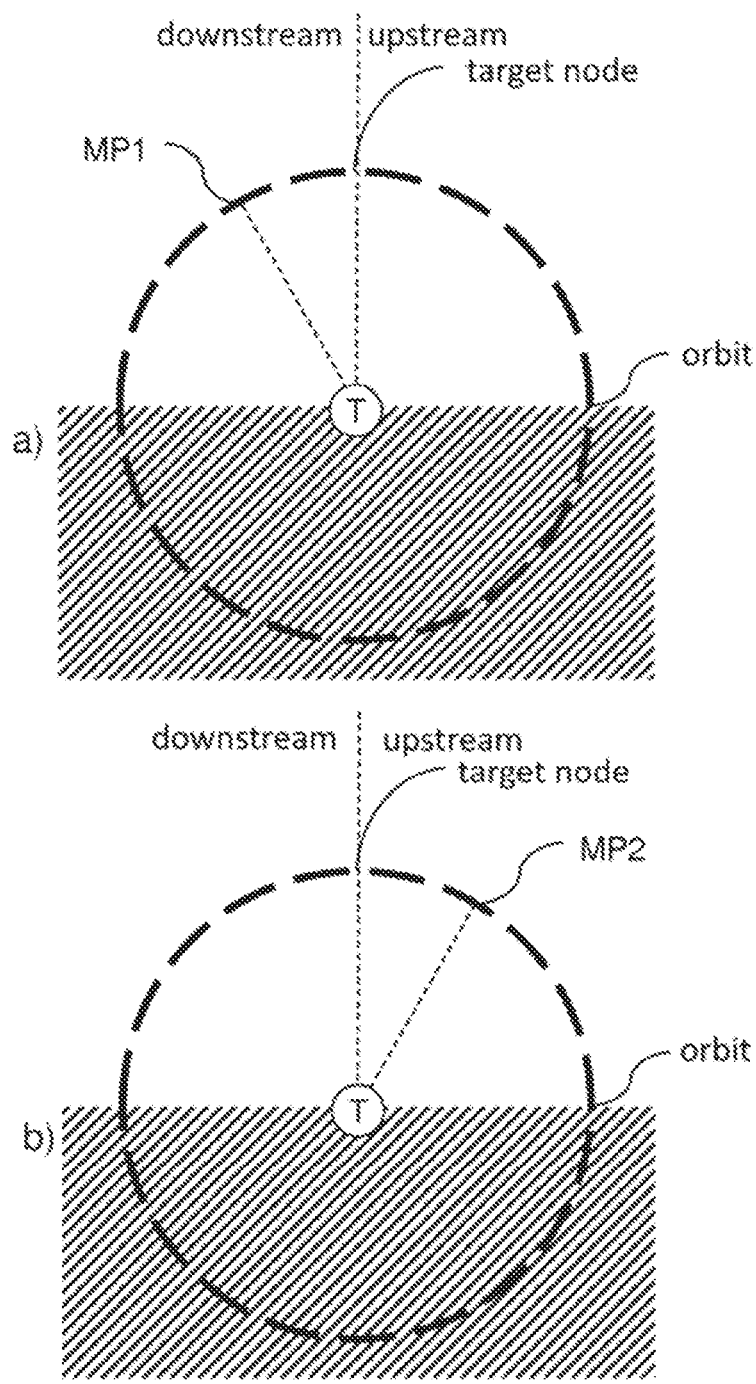
FIG. 5 is a schematic representation of a second example of a maneuvering plan.
Figure 6:
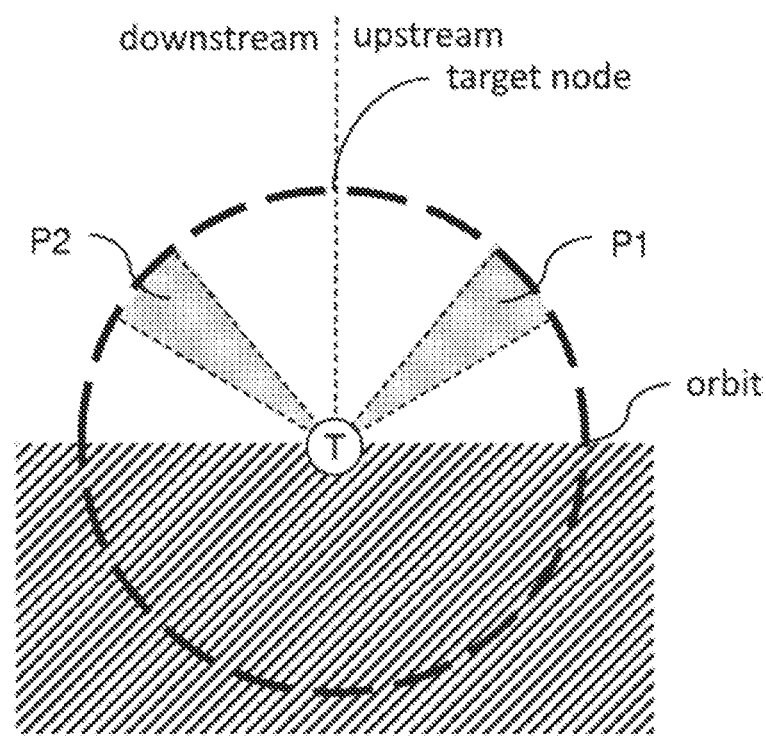
FIG. 6 is a schematic representation of a preferred mode of implementation of a maneuvering plan.

FIGS. 4 to 6 schematically represent examples of maneuvering plans. FIGS. 4 to 6 show the orbit of the satellite 10 around the Earth T, as well as the target node. In FIGS. 4 to 6, the hatched areas correspond to the portions of the orbit which are excluded from the execution of thrust maneuvers, i.e. the portions of the orbit which are outside an angular range of 180° centered on the target node.

FIG. 4 schematically represents an example of a maneuvering plan which is defined over a single orbital period. As illustrated by FIG. 4, the maneuvering plan comprises thrust maneuver MP1 executed upstream of the target node and thrust maneuver MP2 executed downstream of said target node, both executed during the same orbital half-period.

FIG. 5 schematically represents an example of a maneuvering plan which is defined over two successive orbital periods. More particularly, part a) of FIG. 5 shows the first orbital period of the maneuvering plan and part b) of FIG. 5 shows the second orbital period of the maneuvering plan. As illustrated by part a) of FIG. 5, the maneuvering plan includes only one thrust maneuver MP1 during the first orbital period, executed downstream of the target node. As illustrated by part b) of FIG. 5, the maneuvering plan includes only one thrust maneuver MP2 during the second orbital period, executed upstream of the target node.

FIG. 6 schematically represents a preferred mode of implementation of a maneuvering plan. In this mode of implementation, the upstream thrust maneuver is executed at least in part when the satellite 10 is located within an angular range P1 of between 40° and 60° upstream of the target node, and the downstream thrust maneuver is executed at least in part when the satellite 10 is located within an angular range P2 of between 40° and 60° downstream of the target node. For example, the upstream thrust maneuver is begun when the satellite 10 is located within angular range P1 (and is completed before or after the satellite 10 leaves said angular range P1), and the downstream thrust maneuver is begun when the satellite 10 is located within angular range P2 (and is completed before or after the satellite 10 leaves said angular range P2). The upstream thrust maneuver and the downstream thrust maneuver may be executed during the same orbital half-period, or during different orbital periods. Preferably, each of the thrust maneuvers of the maneuvering plan is executed when the satellite 10 is within one of the angular ranges P1 and P2. Such arrangements make it possible to limit the movements of the articulated arm between two thrust maneuvers, while reducing fuel overconsumption linked to the fact that the thrust maneuvers are not executed in the immediate vicinity of the target node, in particular when an upstream thrust maneuver and a downstream thrust maneuver are executed during a same orbital half-period.

It should be noted that the examples represented by FIGS. 4 to 6 are not limiting, and other maneuvering plans are possible. Preferably, when the maneuvering plan is defined over several orbital periods, it comprises at least one thrust maneuver per orbital period. It should be noted that the number of thrust maneuvers per orbital period may vary from one orbital period to another. For example, the maneuvering plan may include a thrust maneuver during a first orbital period, then two thrust maneuvers during a second orbital period, etc. Furthermore, it should be noted that the thrust maneuvers are not necessarily arranged symmetrically relative to the target node. For example, the maneuvering plan may include an upstream thrust maneuver executed 40° upstream of the target node and a downstream thrust maneuver executed 55° downstream of the target node, etc.

More generally, it should be noted that the modes of implementation and the embodiments considered above have been described as non-limiting examples, and that other variants are therefore possible.

In particular, the invention has been described by primarily considering a satellite 10 comprising two articulated arms 20,21 each comprising three joints. However, in other examples, nothing excludes considering a satellite 10 comprising a different number of articulated arms, greater than or less than two, and comprising a number of joints and/or degrees of freedom that is greater than three.

The invention claimed is:

1. A method for orbit control of a satellite in Earth orbit and for desaturation of an angular momentum storage device of said satellite, said satellite comprising:
　an articulated arm having at least three degrees of freedom,
　said articulated arm comprising a first end connected to a body of the satellite and a second end carrying a propulsion unit,
　said articulated arm being configured to move said second end within a motion volume included in a half-space delimited by an orbital plane of the satellite when said satellite is in a mission attitude,
　said method comprises:
　a single-arm control mode using only the propulsion unit carried by the articulated arm to control the Earth orbit of the satellite and to desaturate the storage device, said single-arm control mode using a maneuvering plan comprising only thrust maneuvers to be executed when the satellite is located within an angular range of at most 180° centered on a predetermined node among the ascending node and the descending node of the orbit of the satellite, referred to as the target node,
　said maneuvering plan comprising at least one upstream thrust maneuver to be executed upstream of said target node and one downstream thrust maneuver to be executed downstream of said target node,
　the upstream thrust maneuver being executed at least in part when the satellite is located within an angular range of between 40° and 60° upstream of the target node, and
　the downstream thrust maneuver being executed at least in part when the satellite is located within an angular range of between 40° and 60° downstream of the target node.

2. The method according to claim 1, each of the upstream and downstream thrust maneuvers of the maneuvering plan is executed at least in part when the satellite is within the angular range of between 40° and 60° upstream of the target node or within the angular range of between 40° and 60° downstream of the target node.

3. The method according to claim 1, wherein the maneuvering plan comprises at least one of the upstream or downstream thrust maneuver per orbital period.

4. The method according to claim 1, wherein the upstream thrust maneuver and the downstream thrust maneuver are executed during a same orbital half-period.

5. The method according to claim 1, wherein the upstream thrust maneuver and the downstream thrust maneuver have propulsion unit thrust forces in respective thrust directions that are non-parallel in an inertial frame of reference, and
　said thrust forces being determined so as to form torques in respective non-parallel planes in the inertial frame of reference and to perform a three-axis desaturation of said angular momentum storage device.

6. The method according to claim 1, wherein the upstream thrust maneuver and the downstream thrust maneuver have propulsion unit thrust forces which are determined so as to control at least the inclination of the orbit of the satellite.

7. The method according to claim 6, wherein the upstream thrust maneuver and the downstream thrust maneuver have propulsion unit thrust forces which are determined so as to further control at least one orbital parameter among the longitude and eccentricity of the orbit of the satellite.

8. The method according to claim 1, wherein the articulated arm comprises:
　at least three joints each having including:
　　at least one degree of freedom in rotation about an axis of rotation,
　　a first joint and a second joint separated by a first connecting member and having respective non-parallel axes of rotation,
　　wherein the second joint and a third joint are separated by a second connecting member and have respective non-parallel axes of rotation,
　　wherein the articulated arm is configured to be controlled to carry out a thrust maneuver by controlling said at least three joints of said articulated arm.

9. The method according to claim 1, wherein, the satellite comprises two articulated arms each having at least three degrees of freedom and each carrying a propulsion unit,
　wherein said two articulated arms are configured to move the propulsion units within respective motion volumes included in respective half-spaces which are opposite each other in relation to the orbital plane of the satellite when said satellite is in the mission attitude,
　wherein said method further comprises a two-arm control mode using the two articulated arms, wherein:
　　the two-arm control mode being used as long as a control mode change criterion is not met, and
　　the single-arm control mode being used when the control mode change criterion is met.

10. The method according to claim 9, wherein the control mode change criterion is met when failure of an articulated arm is detected.

11. A satellite configured to be placed in Earth orbit, comprising:
　an articulated arm having at least three degrees of freedom, said articulated arm comprising:
　　a first end connected to a body of the satellite, and
　　a second end carrying a propulsion unit,
　　said articulated arm configured to move said second end within a motion volume included in a half-space delimited by an orbital plane of the satellite when said satellite is in a mission attitude, and
　　wherein said satellite comprises means configured to implement the method for orbit control and desaturation according to claim 1.

12. A satellite system comprising a ground station and a satellite in Earth orbit, said satellite comprising:
　an articulated arm having at least three degrees of freedom, said articulated arm comprising:
　　a first end connected to a body of the satellite and a second end carrying a propulsion unit,
　　said articulated arm configured to move said second end within a motion volume included in a half-space delimited by an orbital plane of the satellite when said satellite is in a mission attitude, and
　　wherein said satellite system comprises means configured to implement the method for orbit control and desaturation according to claim 1.

13. The satellite system according to claim 12, wherein the articulated arm comprises at least three joints each having:
　at least one degree of freedom in rotation about an axis of rotation,
　a first joint, and
　a second joint separated by a first connecting member and having respective non-parallel axes of rotation, and
　a third joint, wherein the second joint and the third joint separated by a second connecting member and having respective non-parallel axes of rotation.

14. The satellite system according to claim 12, wherein the satellite comprises only electric thrusters.

15. The satellite system according to claims 12, wherein the satellite is in geostationary orbit.

* * * * *